United States Patent [19]

Scherzer et al.

[11] Patent Number: 5,596,045

[45] Date of Patent: Jan. 21, 1997

[54] EXPANDABLE STYRENE POLYMERS CONTAINING RECYCLED MATERIAL

[75] Inventors: Dietrich Scherzer; Wolfram Husemann, both of Neustadt; Michael Witt, Ludwigshafen; Klaus Hahn, Kirchheim; Knut Kaempfer, Ludwigshafen; Gerhard Alicke, Worms, all of Germany

[73] Assignee: BASF Aktiengesellschaft, Ludwigshafen, Germany

[21] Appl. No.: 548,725

[22] Filed: Oct. 26, 1995

[30] Foreign Application Priority Data

Oct. 27, 1994 [DE] Germany ............... 44 38 376.2

[51] Int. Cl.$^6$ .............. C08J 9/18; B29B 17/00; C08F 12/08

[52] U.S. Cl. .............. 525/241; 264/53; 264/45.5; 321/56

[58] Field of Search ............... 525/241; 264/45.5, 264/53; 521/56

[56] References Cited

U.S. PATENT DOCUMENTS 4,452,751  6/1984  McCullough ............ 264/45.5
4,990,540  2/1991  Hahn et al. ............... 521/56
5,269,948  12/1993  Krutchen ................. 210/774

FOREIGN PATENT DOCUMENTS 000513   2/1979   European Pat. Off. .
68298    1/1983   European Pat. Off. .
405324   1/1990   European Pat. Off. .
379084   7/1990   European Pat. Off. .
4215113  11/1993  Germany .
4319180  1/1994   Germany .

OTHER PUBLICATIONS

Encyclopedia of Polymer Science and Engineering, T. Wiley & Sons, 1989, v. 16, pp. 193–205.
Derwent JP 5098062 abstract Apr. 1993.
Japanese Abstract JP 5 6060 096.

*Primary Examiner*—Irina Zemel
*Attorney, Agent, or Firm*—Keil & Weinkauf

[57] ABSTRACT

Expandable styrene polymers containing recycled polystyrene have a content of recycled material of up to 40% by weight, based on the total weight of the polystyrene, wherein, in the course of the polymerization of the reaction mixture, from 100 to 500 ppm of a molecular weight regulator and/or from 0.05 to 1.0% by weight, based in each case on the polymerization solution, of a finely divided polyethylene wax are added.

6 Claims, No Drawings

EXPANDABLE STYRENE POLYMERS CONTAINING RECYCLED MATERIAL

BACKGROUND OF THE INVENTION

1. Field of the Invention

The present invention relates to expandable styrene polymers which contain recycled material and can be processed to give foams having improved foam structure.

Plastics which are based on styrene and styrene-containing copolymers are produced in large amounts and used in many areas of industry. Foamed products are also important here.

The preparation and use of these products have long been known and are described in many publications.

A problem which has become particularly important especially in recent times is the recycling of used plastics.

Various methods are known for this in the case of polystyrene foams.

2. Description of the Related Art

In one possible method, wastes comprising polystyrene foams or unexpanded polystyrene are used in the extrusion of polystyrene foams. Here, the recycled material may be used both alone and as a mixture with fresh polystyrene.

The preparation of foams from the recycled materials can be carried out here in the usual way directly by gassing the polymer in the extruder and then expanding it to give sheets or by extrusion to give minigranules, which can be impregnated with blowing agent and expanded.

It is in principle also possible to dissolve the used polystyrene in monomeric styrene and polymerize this solution again by a known process. Such processes are described, for example, in U.S. Pat. No. 5,269,948 or JP-A-56 60096, no explanation being given as to how the properties of commercial EPS raw material can be achieved.

One problem is that the used polystyrene is often highly contaminated.

DE-A 42 15 113 proposes compacting used polystyrene foam by treatment with lower alkanes and alcohols and at the same time purifying it. The disadvantage here is that the solvent has to be removed in an expensive procedure.

DE-A 43 19 180 and U.S. Pat. No. 5,269,948 disclose that used polystyrene is dissolved in monomeric styrene, this solution is freed from mechanical impurities in a manner known per se, for example by filtration, and the resulting solution then polymerized again. In the suspension polymerization of such solutions of used polystyrene in monomeric styrene, however, undesirably high internal water contents frequently occur in particular owing to impurities and any comonomers and additives present in the recycled material.

Another disadvantage of the styrene polymers prepared by polymerization of solutions of recycled polystyrene in monomeric styrene is that the foams produced therefrom generally have an undesirable fine-cell structure.

It is an object of the present invention to provide expandable polystyrene bead polymers which contain recycled material, have a low internal water content, can be processed to give foams having a uniform foam structure without undesirable fine cells and good mechanical properties and are simple to prepare.

We have found that this object is achieved, surprisingly, by expandable polystyrene bead polymers which contain recycled polystyrene and can be prepared by dissolving the recycled polystyrene in monomeric styrene or a mixture of at least 50% by weight of monomeric styrene with other olefinically unsaturated monomers, converting this solution into an aqueous suspension and polymerizing it by a process known per se, wherein, in the course of the polymerization of the reaction mixture, from 100 to 500 ppm of a molecular weight regulator and/or from 0.05 to 1.0% by weight, based in each case on the polymerization solution, of a finely divided polyethylene wax are added.

The term polymerization solution is understood here as meaning the solution of the recycled polystyrene in the monomer.

SUMMARY OF THE INVENTION

The present invention accordingly relates to expandable polystyrene bead polymers which contain up to 40% by weight, based on the total weight of the polystyrene, of recycled polystyrene and to which from 100 to 500 ppm of a molecular weight regulator and/or from 0.05 to 1.0% by weight, based in each case on the polymerization solution, of a finely divided polyethylene wax are added in the course of the polymerization.

DESCRIPTION OF PREFERRED EMBODIMENTS

The molecular weight regulators used are the compounds known for this purpose, such as tert-butyl dodecyl mercaptan or dimerized α-methylstyrene. Dimerized α-methylstyrene is preferably used.

The present invention furthermore relates to a process for the preparation of expandable polystyrene bead polymers, which comprises dissolving the recycled polystyrenes in monomeric styrene, if appropriate with other olefinically unsaturated monomers, suspending this solution in an aqueous suspending medium and polymerizing this solution in suspension, from 0.05 to 1.0% by weight of a finely divided polyethylene wax and/or from 10 to 500 ppm, based in each case on the polymerization solution, of a molecular weight regulator being added in the course of the polymerization to the mixture.

The present invention also relates to foams which can be prepared by expanding the novel expandable polystyrene bead polymers containing recycled material by the known expansion methods for the preparation of polystyrene foams, in particular by the particle foam method.

Expanded or unexpanded products may be used here as recycled polystyrene. In the case of recycled expanded polystyrenes, compaction should be effected before processing in order to reduce the volume.

This can be carried out, for example, by compression or milling of the foams or in an extruder having a devolatilization apparatus.

The recycled polystyrene can be dissolved in the styrene monomer at room temperature or at slightly elevated temperatures. It is advantageous to carry out the dissolution while stirring.

The assistants, catalysts and additives required for the polymerization may also be added to the solution. The maximum amount of recycled material used depends on the solubility of the recycled polystyrene in the monomers and on the viscosity of the solution in styrene. Solutions containing up to 40% by weight of polystyrene can still be handled with the conventional apparatuses. Filtration of the solution is useful for obtaining a particularly high-quality EPS raw material.

To carry out the polymerization, the solution is converted into an aqueous suspension and the latter is polymerized by a process known per se and described, for example, in EP-A 405 324.

Particularly advantageous results are obtained if the amount of suspension stabilizer is increased to about 0.4%.

The suspension stabilizers used are the compounds known per se, such as the molecular colloids polyvinylpyrrolidone, polyvinyl alcohol or Pickering stabilizers, such as tricalcium phosphate and magnesium pyrophosphate.

The polyethylene waxes used according to the invention generally have a number average molecular weight of from 2,000 to 6,000, preferably from 2,000 to 4,000, particularly preferably from 2,800 to 3,500. A particularly suitable polyethylene wax is Luwax®, which is available from BASF AG and has a number average molecular weight of 3,000. The polyethylene waxes preferably have a mean particle size of from 5 to 50 µm. Particles which are too large give rise to problems with the distribution in the polymer, or products which are too fine can result in annoying dusts.

In particular, styrene is used as the vinyl-containing monomer. However, mixtures of styrene with other vinyl-containing monomers may also be used. These mixtures advantageously have a styrene content of at least 50% by weight. The other vinyl-containing monomers used are, for example, acrylonitrile, methylstyrene, styrenes halogenated or alkylated in the nucleus, esters of acrylic acid or methacrylic acid with alcohols of up to 8 carbon atoms, N-vinyl compounds, such as vinylcarbazole, or small amounts of compounds which contain two polymerizable double bonds, such as butadiene, divinylbenzene or butadiene diacrylate.

The styrene polymers may also contain other conventional additives which impart certain properties to the expandable products. Examples are flameproofing agents based on organic bromine or chlorine compounds, such as trisdibromopropyl phosphate, hexabromocyclododecane and chloroparaffin, and synergistic agents for the flameproofing agents, such as dicumyl and highly unstable organic peroxides, as well as antistatic agents, stabilizers, dyes, lubricants, fillers and substances which have an antiadhesive action during foaming, such as zinc stearate, melamine/formaldehyde condensates or silica, and agents for reducing the demolding time during expansion, such as glyceryl esters or hydroxycarboxylic esters. The additives may be homogeneously distributed in the particles or may be present as a surface coating, depending on the intended effect.

In order to prepare the novel expandable styrene polymers containing recycled material, the recycled polystyrene is first dissolved in the vinyl-containing monomers.

To eliminate mechanical impurities which are insoluble in the vinyl-containing monomers, the solution is advantageously filtered before the polymerization. The mesh size of the screen used should be very fine (from 50 to 100 µm), in order to achieve optimum purification of the solution.

The suspension polymerization is carried out in general in the presence of a suspension stabilizer and a conventional styrene-soluble polymerization catalyst.

In the novel process, the blowing agent is generally added during the polymerization, but it is also possible to introduce the blowing agent into the styrene polymer in a subsequent process step.

For the preparation of foams, the expandable styrene polymer beads are expanded in a known manner by heating to above their softening point, for example with hot air or, preferably, with steam. After cooling and, if required, intermediate storage, the resulting foam particles can be further expanded by additional heating. They can then be welded in a known manner in non-gastight molds to give moldings.

Further information on the conventional impregnation, extrusion and expansion processes appears, for example, in Kunststoffhand-buch, volume 5, Polystyrol, editors R. Vieweg and G. Daumiller, Carl-Hanser-Verlag Munich, 1969.

Compared with other polystyrene foams containing recycled material, the novel polystyrene foams have a uniform foam structure. Even slight contamination of the recycled material by other polymers and additives which cannot be removed by the conventional purification processes has no disadvantageous effects on the foam structure of the novel products.

Thus, even expanded and unexpanded polystyrene wastes which occur outside the actual production process and have different material characteristics and in some cases also contain different additives can be processed to high-quality particulate foams by a very simple process.

In particular, it is also possible to process flameproofed polystyrene wastes to give particulate polystyrene foams.

The examples which follow illustrate the invention.

EXAMPLES 1 to 20

A mixture of 19.5 kg of demineralized water, 19.5 g of $Na_4P_2O_7$ and 52.7 g of $MgSO4$ was initially taken in a pressure-resistant stainless steel 50 l stirred kettle. 17 kg of a solution of the amount of recycled polystyrene stated in the table in styrene, 17 g of dibenzoyl peroxide and 51 g of dicumyl peroxide were added. The mixture was heated from 25° C. to 100° C. in the course of 2 hours and then from 100° C. to 130° C. in the course of 5 hours. The mixture was kept at 130° C. for a further 3 hours.

55 minutes after the mixture had reached 80° C., 478 g of a 10% strength aqueous polyvinylpyrrolidone solution (K value 90) and the amounts of polyethylene wax (Luwachs® from BASF AG) stated in the table and, after a further 95 minutes, 1.3 kg (corresponding to 7.5%, based on the styrene polymer) of n-pentane were added to the mixture.

The beads obtained were separated off by centrifuging, dried with cold air by the countercurrent method and coated with 0.1% by weight, based on the weight of the uncoated beads, of ethylene-bisstearamide.

The bead size fraction from 0.70 to 1.00 mm was then separated off by sieving and was coated with 0.5% by weight, based on the blowing agent-containing styrene polymers, of a mixture of 40% by weight of tristearyl citrate, 50% by weight of glycerol monostearate and 10% by weight of silica FK 320 (from Degussa).

Preexpansion was carried out for 6 minutes in an expansion box (from Rauscher) at atmospheric pressure and the foam structure of the resulting particles was determined.

The exact ratios of the starting materials and the properties of the foams are listed in Table 1.

The recycled polystyrene had a viscosity number of 60 g/ml, a toluene-insoluble residue of 0.2% by weight and a residue after ashing of 0.05% by weight, based in each case on the weight of the recycled material.

TABLE 1

| Example | Recycled material [% by wt.] | Polyethylene wax [% by wt.] | Dimeric α-methylstyrene [ppm] | Cells [1/mm] | Viscosity number [ml/g] | Internal water content [% by wt.] | Bulk density [g/l] | Foam structure | Remarks |
|---|---|---|---|---|---|---|---|---|---|
| 1 | — | — | — | 6 | 75 | 0.3 | 25 | coarse | Comp. Ex. |
| 2 | 10 | — | — | 6 | 76 | 0.8 | 28 | poor | Comp. Ex. |
| 3 | 20 | — | — | 6 | 78 | 1.2 | 30 | poor | Comp. Ex. |
| 4 | 20 | 0.1 | — | 8 | 78 | 1.1 | 29 | good | |
| 5 | 20 | 0.1 | 1000 | 8 | 75 | 1.1 | 26 | good | |
| 6 | 20 | 0.1 | 1000 | 8 | 75 | 0.8 | 26 | very good | * |
| 7 | 30 | 0.1 | 1000 | — | — | — | — | — | ** |
| 8 | 30 | 0.1 | 1000 | 7 | 78 | 1.3 | 30 | coarse | *** |
| 9 | — | — | — | 6 | 75 | 0.3 | 25 | coarse | Comp. Ex. |
| 10 | 10 | — | — | 6 | 76 | 0.8 | 28 | poor | Comp. Ex. |
| 11 | 20 | — | — | 6 | 78 | 1.2 | 30 | poor | Comp. Ex. |
| 12 | 20 | 0.1 | — | 8 | 78 | 1.1 | 29 | good | |
| 13 | 20 | 0.1 | 1000 | 8 | 75 | 1.1 | 26 | good | |
| 14 | 20 | 0.1 | 1000 | 8 | 75 | 0.8 | 26 | very good | * |
| 15 | 30 | 0.1 | 1000 | 7 | 76 | 1.0 | 28 | good | |
| 16 | 20 | 0.1 | 1000 | 8 | 79 | 1.0 | 27 | | |

*Solution of the recycled material in styrene was filtered through a 50 μm filter after preparation
**Batch coagulated
***Addition of twice the amount of polyvinylpyrrolidone solution

We claim:

1. An expandable styrene polymer which contains from 10 to 40% by weight, based on the total weight of the polystyrene, of recycled polystyrene, wherein said styrene polymer is prepared by dissolving the recycled polystyrene in monomeric styrene and polymerizing this solution in aqueous suspension, and wherein from 0.05 to 1% by weight of a finely divided polyethylene wax and/or from 10 to 500 ppm of a molecular weight regulator is added to said aqueous suspension in the course of the polymerization.

2. An expandable styrene polymer as defined in claim 1, wherein from 10 to 500 ppm of a molecular weight regulator are added to the styrene polymer.

3. An expandable styrene polymer as defined in claim 1, wherein from 0.05 to 1.0% by weight of finely divided polyethylene wax is added to the styrene polymer.

4. An expandable styrene polymer as defined in claim 1, wherein from 0.05 to 1.0% by weight of finely divided polyethylene wax and from 10 to 500 ppm of a molecular weight regulator are added to the styrene polymer.

5. An expandable styrene polymer as defined in claim 1, wherein the finely divided polyethylene has a number average molecular weight of from 2,000 to 6,000.

6. An expandable styrene polymer as defined in claim 1, wherein the molecular weight regulator is dimerized α-methylstyrene.

* * * * *